United States Patent [19]

Giddings et al.

[11] 4,027,090
[45] May 31, 1977

[54] MERCAPTAN-HYDROCARBON CHAIN MODIFIERS IN ACRYLONITRILE COPOLYMERS

[75] Inventors: Brandford E. Giddings, Warrensville Heights; Janet M. Eggett, Oxford, both of Ohio

[73] Assignee: Standard Oil Company, Cleveland, Ohio

[22] Filed: Feb. 5, 1976

[21] Appl. No.: 655,439

[52] U.S. Cl. .................. 526/224; 260/29.6 AN; 526/222; 526/223; 526/292; 526/328; 526/330; 526/332; 526/342
[51] Int. Cl.² ............... C08F 220/44; C08F 220/50
[58] Field of Search ........................ 526/224, 342

[56] References Cited
UNITED STATES PATENTS
3,915,942  10/1975  Tamura ........................ 526/224

OTHER PUBLICATIONS
Katagiri et al., J. Pol. Sci., 17 (1955) pp. 142–145.

Primary Examiner—Harry Wong, Jr.
Attorney, Agent, or Firm—John F. Jones; Sherman J. Kemmer

[57] ABSTRACT

Acrylonitrile copolymers having controlled molecular weight are prepared using a synergistic mixture of mercaptan and certain hydrocarbons as chain transfer agent.

4 Claims, No Drawings

MERCAPTAN-HYDROCARBON CHAIN MODIFIERS IN ACRYLONITRILE COPOLYMERS

The present invention relates to a polymerization process for preparing acrylonitrile copolymers having controlled molecular weights, and more particularly pertains to such a process which employs a synergistic mixture of a mercaptan and a member selected from the group consisting of cyclohexane and ethyl benzene as the molecular weight controller.

In the preparation of acrylonitrile copolymers and graft copolymers, it is well known to employ mercaptans in the polymerization reaction for the purpose of controlling the molecular weight of the product, see U.S. Pat. No. 3,891,722, for instance. We have discovered that an unexpected synergistic effect is achieved in the use of cyclohexane or ethyl benzene in combination with a mercaptan as molecular weight modifier in the preparation of acrylonitrile copolymers.

The polymers which are most useful in the process of this invention include those produced by copolymerizing a monounsaturated nitrile, such as acrylonitrile, and at least one other monovinyl monomer component copolymerizable with said nitrile.

The other monovinyl monomer component copolymerizable with the monounsaturated nitrile can be one or more of an ester of an olefinically unsaturated carboxylic acid, an alpha-olefin, a vinyl aromatic monomer such as styrene, a vinyl ester such as vinyl acetate, a vinyl ether such as ethyl vinyl ether, and the like.

The olefinically unsaturated nitriles useful in the present invention are the alpha,beta-olefinically unsaturated nitriles having the structure

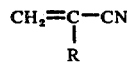

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids include those having the structure

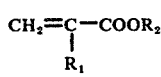

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

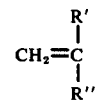

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, the vinyl propionates, the vinyl butyrates, and the like. Most preferred is vinyl acetate.

The vinyl aromatic monomers include styrene, alpha-methyl styrene, the vinyl toluenes, the vinyl xylenes, indene, and the like. Most preferred is styrene.

The olefinically unsaturated nitrile copolymers useful in this invention can be prepared from 1 to 90% by weight of the olefinically unsaturated nitrile and correspondingly from 99 to 10% by weight of the other monovinyl monomer component.

Specific polymerizates which can readily be prepared according to the process of this invention include those prepared by polymerization of 100 parts by weight of (A) at least 50% by weight of at least one nitrile having the structure

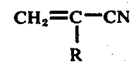

wherein R has the foregoing designation and (B) up to 50% by weight based on the combined weight of (A) and (B) of at least one member selected from the group consisting of (1) an ester having the structure

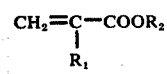

wherein $R_1$ and $R_2$ have the foregoing designations, (2) an alpha-olefin having the structure

wherein R' and R" have the foregoing designations, (3) a vinyl ether selected from the group consisting of methyl vinyl ether, ethyl vinyl ether, the propyl vinyl ethers and the butyl vinyl ethers, (4) vinyl acetate, and (5) styrene. More preferably, component (A) should be present in from about 60 to 90% by weight based on the combined weight of (A) and (B).

The polymerization process of this invention can be carried out by any of the known general techniques of polymerization including bulk, solution, emulsion, and suspension polymerization techniques by batch, continuous or intermittent addition of monomers and other polymerization ingredients. The preferred method is emulsion polymerization in an aqueous medium. The combined mercaptan-hydrocarbon molecular weight modifier or chain transfer agent is preferably not added to the polymerization reaction until after some conversion of monomer to polymer has taken place. The polymerization is carried out preferably in an aqueous medium in the presence of an emulsifier and free radical generating polymerization initiator at a temperature of from about 0° to about 100° C in the substantial absence of molecular oxygen. The polymer chain modifier combination is added to the polymerization reaction only after from about 1 to 10% by weight of the olefinic nitrile monomer and other monovinyl monomer is converted to polymer.

Emulsifying agents which may be used in the aqueous polymerization process include the soaps such as sodium and potassium myristate, laurate, palmitate, oleate, stearate, resinate, and hydroabietate; alkali metal alkyl and alkylene sulfonates such as sodium potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrobromide; and higher molecular weight materials such as polyvinyl pyrrolidone, sodium polyacrylate, lecithin, methyl cellulose, and the like.

The produce of the aqueous emulsion polymerization is usually a latex. The resin may be recovered from the latex by any suitable means such as by coagulation with electrolytes or solvents, by freezing, and the like.

Other materials including plasticizers, stabilizers, lubricants, dyes, pigments, and fillers may be added to the products of our process.

The resinous polymeric products of the process of this invention are thermoplastic materials which can be thermoformed into a wide variety of useful articles in any of the conventional ways employed with known thermoplastic polymeric materials, such as by extrusion, milling, molding, drawing, blowing, and the like. The polymeric products of the process of this invention are very useful in the packaging industry and they are particularly useful in the manufacture of bottles, film, sheet, and other types of containers for liquids and solids.

For the purpose of this invention, the terms "chain transfer agent", "polymer molecular weight modifier", "polymer chain modifier" and "regulator" mean the same and are used interchangeably. A true chain transfer agent is one which when included in a free radical polymerization reaction lowers the molecular weight of the polymer formed. Most commonly used mercaptans for this purpose are long chain alkyl mercaptans. Mercaptans useful in this invention include the primary, secondary, and tertiary alkyl mercaptans containing from 4 to 16 carbon atoms, such as n-dodecyl mercaptan, t-dodecyl mercaptan, n-dodecyl thiolacetate, the tetra-mercapto ester of pentaerythritol and beta-mercapto propionic acid, limonene dimercaptan, n-octyl mercaptan, and n-hexyl mercaptan. Other chain transfer agents useful in this invention include:

1,1,3,3-tetramethyl-1-butanethiol
1,1,3,3,5,5,7,7-octamethyl-1-tetradecanethiol
1,1,3,3,5,5-hexamethyl-1-hexanethiol
dithio-diacetic acid diethyl ester
3-mercapto-acetophenone
p,p'-dithioanisole
4-bromobenzenethiol
bis-(p-bromophenyl) disulfide
bis-(p-chlorophenyl) disulfide
bis-(dimethylthiocarbamoyl) disulfide
bis-(o-nitrophenyl) disulfide
2-mercapto ethanol
ethyl disulfide
2-naphthalenethiol
phenyl disulfide
2-methyl propanethiol
sulfur
m-toluenethiol
p-tolyl disulfide
o,o'-dithiobis-aniline
4,4'-dithiobis-anthranilic acid
2-benzimidazolethiol
o-mercapto-benzoic acid
2,2'-dithiobis-benzothiazole
2-benzothiazolethiol
benzoyl disulfide
p,p'-dithiobis-benzyl alcohol
butyl disulfide
dithiocarbonic acid
2,2'-dithiolepidine
4,4'-dithiomorpholine
3-mercapto-propionic acid
2,2'-dithiodiquinidine
hydrogen sulfide
acetyl disulfide
xanthogen disulfide The combination mercaptan-hydrocarbon polymer modifier should be used in from 0.01 to 10 parts based on 100 parts of monomer and the weight ratio of mercaptan to hydrocarbon should be in the range of 0.01 to 10, respectively.

For the purpose of this invention, the preferred mercaptans are the primary, secondary and tertiary alkyl mercaptans containing from 4 to 16 carbon atoms, and particularly preferred are the organic mercapto compounds containing more than one mercapto group per molecule such as limonene dimercaptan, the tetra ester of pentaerythritol and beta-mercapto propionic acid, and the like. As is well known, most mercaptans are of foul odor and use of higher levels of mercaptans as polymer modifiers often imparts bad odor and taste to the polymer. It is extremely important for resins to be used in the packaging of foods, drugs and cosmetics that no bad odor or taste be transferred from the resin to the product packaged therein. Our discovery that part of the normally used mercaptan can be replaced with an alkyl benzene is most advantageous from the standpoint of minimizing or even eliminating the last traces of odor or taste in the resin product.

In the following illustrative examples, the amounts of ingredients are expressed in parts by weight unless otherwise indicated.

A. By one polymerization procedure, all of the hydrocarbon modifier was placed in the polymerization reactor with all of the water and emulsifier along with about 20% by weight of the monomer and mercaptan. This mixture was then heated and stirred with nitrogen purging until the desired polymerization temperature was reached. At that time, the polymerization initiator was added and when the total solids content of the polymerization mixture reached about 2%, the remainder of the monomer-mercaptan feed was added continuously over about a 4-hour additional reaction period.

B. By another procedure, about 20% by weight of the monomer-mercaptan-hydrocarbon modifier mixture was added to the water-emulsifier mixture in the polymerization reactor. The reaction mixture was then heated with stirring and nitrogen purging, and at the desired reaction temperature the polymerization initiator was added. When the total solids of the polymerization mixture reached about 2%, the remainder of the monomer-mercaptan-hydrocarbon modifier mixture was added continuously over about a 4-hour period.

C. By another polymerization procedure, a small portion of the monomers, acrylonitrile/styrene, was precharged to the polymerization reactor in a weight ratio of 15/1 by weight with all of the water, emulsifier and hydrocarbon modifier. This mixture was heated, stirred and nitrogen purged and when the desired reaction temperature was reached, the initiator was all added and the reaction was allowed to proceed until about 2% total solids was reached. At that time, the monomer-mercaptan mixture was added continuously to the reactor over about a 4-hour period.

EXAMPLES 1-7

Several resins were prepared, each using one of the polymerization procedures designated A-C above, and the products were evaluated for processability (a function of molecular weight) in a Brabender plasticorder at 230° C for 12 minutes. The Brabender torque values for the various resins are shown in the following table. The higher torque values represent higher molecular weights and the lower torque values represent lower molecular weights for the resins.

Table

| Example | Monomers (phm) | Polymerization Procedure | Mercaptan (phm) | Hydrocarbon Modifier (phm) | Reaction Temperature (°C) | Brabender Torque (meter grams) |
|---|---|---|---|---|---|---|
| 1 | acrylonitrile 75 styrene 25 | A | limonene dimercaptan 0.5 | ethyl benzene 4 | 75 | 200 |
| 2 | acrylonitrile 75 styrene 25 | B | limonene dimercaptan 0.5 | none | 75 | 900 |
| 3 | acrylonitrile 75 styrene 25 | B | none | ethyl benzene 4 | 75 | 1810 |
| 4 | acrylonitrile 75 styrene 25 | B | none | cyclo-hexane 4 | 75 | 2700 |
| 5 | acrylonitrile 75 styrene 25 | B | limonene dimercaptan 0.5 | cyclo-hexane 4 | 75 | 320 |
| 6 | acrylonitrile 75 styrene 25 | B | none | none | 75 | 2750 |
| 7 | acrylonitrile 77 styrene 23 | C | t-dodecyl mercaptan 1.0 | ethyl benzene 4 | 75 | 1700 |
| 8 | acrylonitrile 77 styrene 23 | C | t-dodecyl mercaptan 1.0 | none | 75 | 2190 |
| 9 | acrylonitrile 77 styrene 23 | C | none | ethyl benzene 8 | 80 | 2260 |
| 10 | acrylonitrile 77 styrene 23 | C | limonene dimercaptan 0.5 | ethyl benzene 8 | 75 | 1100 |
| 11 | acrylonitrile 77 styrene 23 | C | limonene dimercaptan 0.5 | ethyl benzene 4 | 75 | 1390 |
| 12 | acrylonitrile 77 styrene 23 | C | limonene dimercaptan 0.5 | benzene 4 | 75 | 3140 |
| 13 | acrylonitrile 77 styrene 23 | C | limonene dimercaptan 0.5 | toluene 4 | 75 | >5000 |
| 14 | acrylonitrile 77 styrene 23 | C | limonene dimercaptan 0.5 | p-xylene 4 | 75 | 2460 |
| 15 | acrylonitrile 70 methyl acrylate 30 | A | limonene dimercaptan 0.5 | ethyl benzene 4 | 70 | 790 |
| 16 | acrylonitrile 70 methyl acrylate 30 | B | limonene dimercaptan 0.5 | none | 70 | 1220 |
| 17 | acrylonitrile 70 methyl acrylate 30 | B | none | ethyl benzene 4 | 70 | 3500 |

We claim
1. The process comprising polymerizing in an aqueous medium 100 parts by weight of monomers comprising
  A. from 60 to 90% of weight of at least one nitrile having the structure

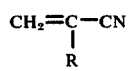

wherein R is hydrogen, a lower alkyl group having from 1 to 4 carbon atoms, or a halogen, and
  B. from 10 to 40% by weight of at least one member selected from the group consisting of
   1. an ester having the structure

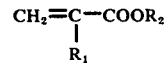

wherein $R_1$ is hydrogen, an alkyl group having from 1 to 4 carbon atoms, or a halogen, and $R_2$ is an alkyl group having from 1 to 6 carbon atoms, 2. an alpha-olefin having the structure

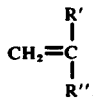

wherein R' and R" are alkyl groups having from 1 to 7 carbon atoms, 3. a vinyl ether selected from the group consisting of methyl vinyl ether, ethyl vinyl ether, the propyl vinyl ethers, and the butyl vinyl ethers,
4. vinyl acetate, and
5. styrene, in the presence of a mercaptan selected from the group consisting of primary, secondary, and tertiary alkyl mercaptans containing from 4 to 16 carbon atoms, the tetra-mercapto ester of pentaerythritol and beta-mercapto propionic acid, and limonene dimercaptan and a hydrocarbon selected from the group consisting of cyclohexane and ethyl benzene, and wherein there is employed from 0.01 to 10 parts per 100 parts by weight of monomer of combined mercaptan-hydrocarbon and the weight ratio of mercaptan to hydrocarbon is from 0.01 to 10, respectively.

2. The process of claim 1 carried out in aqueous emulsion.

3. The process of claim 2 wherein the hydrocarbon is ethyl benzene.

4. The process of claim 3 wherein the hydrocarbon is cyclohexane.

* * * * *